Dec. 19, 1961   J. A. BURKE, JR   3,013,505
GROUND EFFECT VEHICLE
Filed April 14, 1960   3 Sheets-Sheet 3
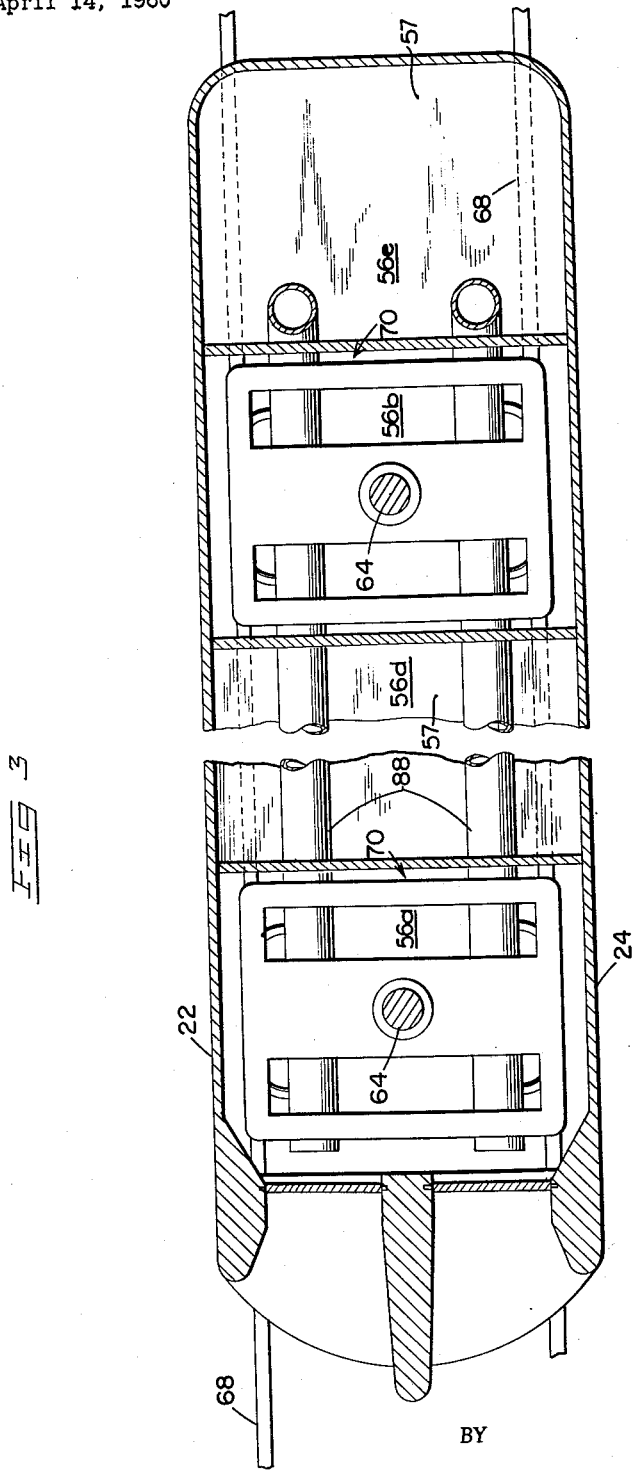
INVENTOR
JERRY A. BURKE JR.
Harold J. Stowell
Harold L. Stowell
BY   ATTORNEYS

United States Patent Office 3,013,505
Patented Dec. 19, 1961

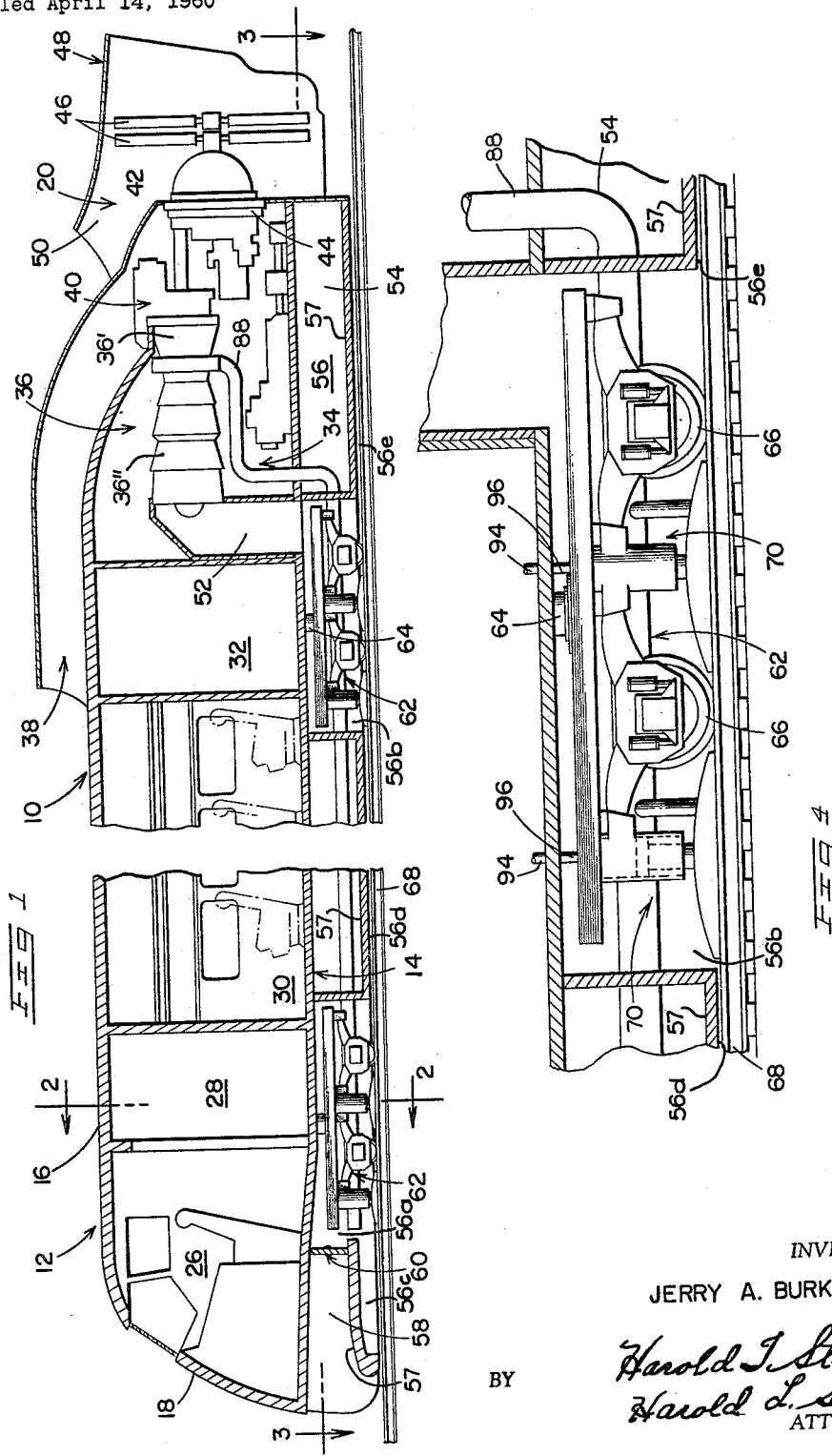

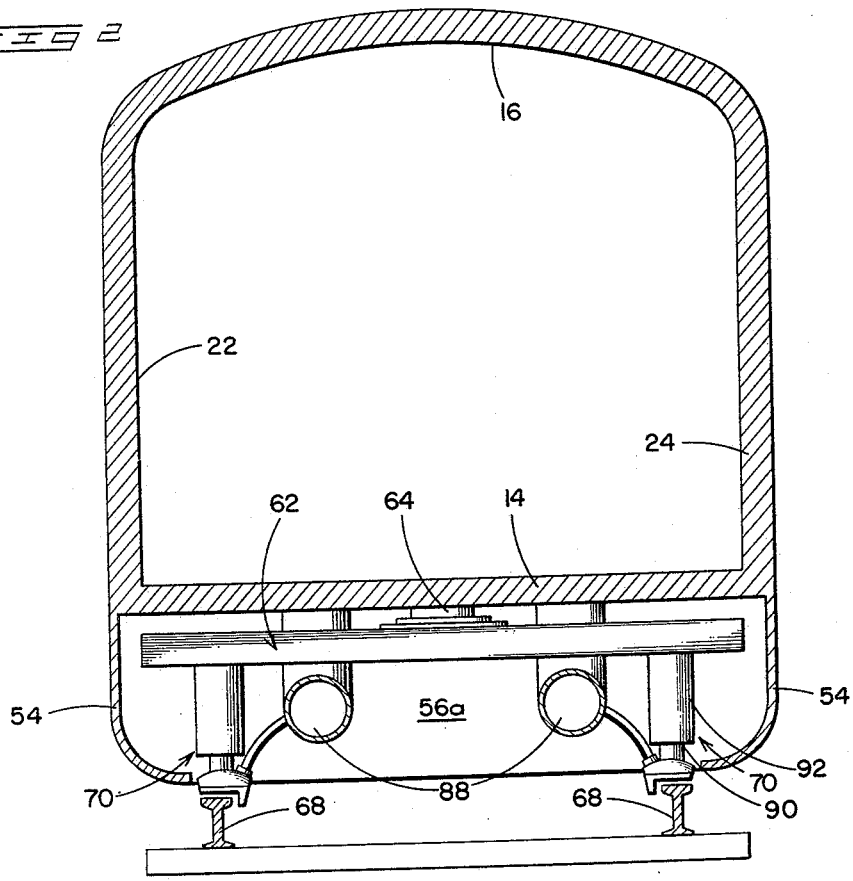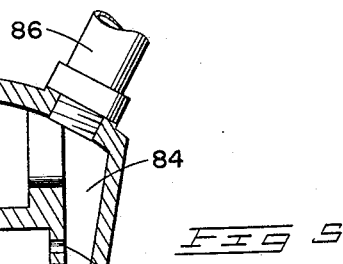

3,013,505
GROUND EFFECT VEHICLE
Jerry A. Burke, Jr., Chesterfield County, Va., assignor to Texaco Experiment Incorporated, Richmond, Va., a corporation of Virginia
Filed Apr. 14, 1960, Ser. No. 22,152
6 Claims. (Cl. 104—134)

This invention relates to an improved ground effect vehicle and, in particular, to a trackway guided ground effect vehicle employing a combination of linear air bearings for lift and guidance of the vehicle and an extended surface plenum chamber augmenting the lift provided by the linear air bearing means.

It is a principal object of the present invention to provide a trackway guided ground effect vehicle wherein the guiding means for the vehicle also provides a portion of the lift for maintaining the vehicle on an air-cushion during operation thereof.

A further object is to provide such a vehicle wherein the combined power requirements of the plenum chamber and the linear air bearing means may be less than the power requirements of a vehicle levitating solely by linear air bearing means or by an extended surface plenum chamber.

A further object is to provide such a vehicle that may be operated on present rail systems without substantial modification thereof.

These and other objects and advantages are provided by the present invention which, in general, comprises a trackway guided ground effect vehicle including a body portion having a floor, generally peripherally depending skirt means defining with the floor an extended chamber open toward the ground, depending truck means mounted on the body portion, flange wheels carried by the truck means and adapted to engage trackways, a plurality of air bearing means mounted on each of the trucks, each of the air bearing means having an extended surface parallel with the bearing surface of the trackways, power means providing a stream of air, and conduit means for directing the stream of air into the extended chamber and between the extended surface of the air bearing means and the bearing surface of the trackways.

The invention will be more particularly described with reference to the attached drawings wherein:

FIG. 1 is a longitudinal sectional view of a trackway guided ground effect vehicle incorporating the improvements of the present invention;

FIG. 2 is a vertical section substantially on line 2—2 of FIG. 1;

FIG. 3 is a fragmentary horizontal sectional view of the illustrated vehicle substantially on line 3—3 of FIG. 1;

FIG. 4 is an enlarged fragmentary view of one of the truck means for the trackway guided vehicle illustrated in FIG. 1; and FIG. 5 is an enlarged fragmentary sectional view through one of the air bearing means and a guiding trackway therefor.

Referring to the drawings, 10 generally designates a trackway guided ground effect vehicle including a body portion 12 having a floor 14, a roof 16, front wall 18, rear wall 20 and side walls 22 and 24.

The body 12 is illustrated as a passenger and material transporting device and includes an operator's compartment 26, baggage and material storage space 28, passenger space 30, further material or fuel storage space 32 and a rearward compartment for the reception of the power means providing the air-cushion for lifting the vehicle above the ground and for propelling the vehicle along the trackways.

The engine compartment 34 houses a gas turbine engine 36 provided with a ram air scoop 38 which directs air into the gas turbine engine adjacent the rearward end 40. The gas turbine engine has a conventional compressor section 36' and a gas expansion turbine section 36". The output shaft 42 of the gas turbine engine 36 is connected to transmission means 44 for the vehicle propeller means generally indicated at 46. The propeller means 46 are mounted in a ducted enclosure 48 having a ram air scoop 50 therefor. The downstream end of the gas turbine engine 36 communicates with a chamber 52 for directing the gases from the gas turbine engine to the ground effect plenum chamber.

Substantially the entire undersurface of the vehicle is formed to provide a large plenum chamber means. This plenum chamber means is provided with side walls or skirt members 54 which depend from the side walls of the vehicle 12. The plenum chamber means comprises five interconnected plenum chambers 56a, 56b, 56c, 56d and 56e. The skirt members 54 cooperate with the floor 14 of the vehicle to provide chambers 56a and 56b which receive the track engaging wheels, and the skirt members 54 cooperate with the subfloor means 57 to provide chambers 56c, 56d and 56e. Since the plenum chambers 56a, b, c, d, and e defined by the skirt member 54 and the floor 14 and subfloor 57 of the vehicle extend substantially under the entire vehicle, the air pressure required to lift the vehicle from the ground on a cushion of air is relatively low. The subfloor 57 is employed to reduce the total volume of the undercar chamber thereby increasing the effectiveness of the air cushion.

Adjacent the forward end of the vehicle the plenum chamber 56a opens into a passage 58 for ram air provided by the forward motion of the vehicle. In the passage 58 is provided an operator or automatically controlled gate or shutter means of conventional design and generally designated 60 whereby the plenum chambers 56a, b, c, d, and e may be closed off from the ram air passage 58.

Mounted to the vehicle are a plurality of trucks generally designated 62. In the drawings only two trucks are illustrated however, one for each chamber 56a and 56b. The number of trucks mounted to the vehicle would depend to a large extent on the length of the rail guided vehicle incroporating the features of the invention. Each of the trucks 62 is mounted for pivotal movement relative to the frame of the vehicle to permit the vehicle to travel on curved track as illustrated at 64.

Each of the trucks 62 mounts plural flanged wheel means 66 adapted to engage trackways 68 in conventional manner and one or more linear air bearing means 70. Each linear air bearing means 70 includes an elongated member 72 having a generally rectilinear lower surface 74 and a rectilinear generally vertical surface 76 extending at right angles therefrom along one of the side edges thereof.

The surfaces 74 and 76 are parallel with the bearing surfaces 78 and 80 respectively of the I-rails 68 and each of these surfaces 74 and 76 communicates with a plenum or pressure chamber 82 and 84, respectively, which plenum chambers are connected to a source of compressed air through flexible pipes 86 which are connected to feeder conduits 88 extending along each side of the vehicle. Feeder conduits 88 communicate at their rearward ends with one of the compressor stages of the gas turbine compressor section 36', as higher pressure, about 150 p.s.i., is required for the linear air bearing means 70 than is provided by the turbine outlet which in general is only about 2 to 3 p.s.i.

The extended surface portion 72 of each of the linear air bearings may be secured to piston means 90 slidably mounted in cooperating cylinders 92 which cylinders are connected to a source of compressed air or hydraulic fluid by conduit means 94 having flexible portions 96 to permit pivoting of the trucks 62 relative to the body 12 of the vehicle.

Interposed between the cylinders 92 and the source of compressed fluid are conventional manual or automatic control valves, not shown, whereby the extended surfaces 74 and 76 of the linear air bearing means may be raised and lowered, depending on whether the vehicle is operating as a ground effect vehicle or on its plural flanged wheels 66.

The plural openings 100 in the extended surface 74 communicate with the plenum chamber 82 of the linear air bearing means 72 and the openings 102 in the surface 76 communicate with the chamber 84 and provide for the passage of the compressed air from said chambers to the surfaces of the rail means 68.

The planar surfaces 74 opposing the top faces 78 of the rails 68 provide a portion of the levitating force for the vehicle while faces 76 opposing faces 80 of the rails 68 are for guidance purposes and maintain the trucks 62 centrally positioned between the pair of spaced rails 68.

In operation of the improved trackway guided ground effect vehicle the gas turbine engine 36 is started and the propellers 46 are caused to rotate while the linear air bearing means 70 are in the retracted position and the vehicle 10 is supported by the flanged wheels 66. Compressed air is forced into the plenum chambers 56a, b, c, d, and e and about the extended surfaces of the linear bearings 72. As the vehicle picks up speed, the shutters or valve means 60 are opened so that the ram effect of the air entering the scoop 58 aids in the maintenance of pressure in the plenum chambers. The operator of the vehicle then controls the valves directing pressure fluid into conduits 94 and the cylinders 92 which move the linear air bearing structures 72 toward the rail 68. As the linear air bearings approach the rails, the ground effect thereof increases and when the levitation force of the combined linear bearings and the plenum chambers overcome the weight of the vehicle, the linear bearings are then moved further downwardly, raising the vehicle off its wheels 66 and guidance and support of the vehicle is then provided solely by the linear air bearings in cooperation with the levitating force of the plenum chambers.

To stop the motion of the vehicle, the forward speed of the vehicle is reduced to a rate where the vehicle can safely travel on the trackways on its wheels 66. When this speed is reached, the linear air bearing means are moved upwardly by reversing the direction of the flow of the hydraulic fluid to the cylinders 92. As the extended surfaces 74 of the linear air bearing means are moved upwardly permitting a greater flow of air between the top surface 78 of the trackways and the extended surfaces of the bearings, the ground effect of the linear bearings is decreased and the vehicle is lowered onto its wheels. With the vehicle travelling on its wheels, the pressure in the plenum chambers and in the chamber of each of the linear air bearings may be substantially decreased so that the entire weight of the vehicle is supported on the wheels 66.

*Example*

A trackway guided vehicle weighing 48,000 lbs. and having a combined plenum chamber means providing an opening of 59,000 square inches directed toward the ground and eight linear bearings presenting a total of 864 square inches of surface parallel to the bearing surface parallel to the bearing surfaces of the trackways would require 730 H.P. for levitation 1 (one) inch above the trackway bed when the air cushion is provided by the plenum chamber means alone.

The same vehicle would require 1113.4 H.P. for levitation when the air cushion is provided solely by the eight linear air bearings with the air bearings maintained .062 inch above the bearing surfaces of the trackways.

By supporting the vehicle on air cushions provided by both the linear air bearings and the plenum chamber means with the air bearings levitating .062 inch above the bearing surfaces of the trackways and the peripheral lower edge of the plenum chamber levitating 1 (one) inch above the top of the rails the power required to support the vehicle would depend on the distribution of the total weight of the vehicle being supported by the linear air bearings on the one hand and the plenum chamber means on the other as indicated in Table I. It will be particularly noted that there is an optimum distribution of the load where the total power requirement is at a minimum.

TABLE I

| Percent of Weight Supported by Plenum Chamber | Percent of Weight Supported by Air Bearings | Total Horsepower Requirements |
|---|---|---|
| 60 | 40 | 758 |
| 70 | 30 | 729 |
| 80 | 20 | 719 |
| 85 | 15 | 706.8 |
| 90 | 10 | 720.4 |

The distribution ratio at which the power requirement is at a minimum will vary with the design parameters of the plenum chamber means and the linear air bearings.

From the foregoing description, it will be readily appreciated by those skilled in the art that the present invention provides new and improved trackway guided ground effect vehicles fully accomplishing the aims and objects hereinbefore set forth.

I claim:

1. A trackway guided ground effect vehicle comprising a body portion including a floor, generally peripherally depending skirt means defining with said floor an extended chamber opened toward the ground, depending truck means mounted on said body portion, flanged wheels carried by said truck means and adapted to engage trackways, a plurality of air bearing means mounted on each of said trucks, each of said air bearing means having an extended surface parallel with the bearing surface of the trackways, power means providing a stream of air, and conduit means for directing said stream of air into said chamber and between said extended surfaces of the air bearings and the bearing surfaces of the trackways.

2. A trackway guided ground effect vehicle comprising a body portion including a floor, generally peripherally depending skirt means defining with said floor an extended chamber opened toward the ground, depending truck means mounted on said body portion, flanged wheels carried by said truck means and adapted to engage trackways, a plurality of retractable air bearing means mounted on each of said trucks, each of said air bearing means having an extended surface parallel with the bearing surface of the trackways, power means providing a stream of air, and conduit means for directing said stream of air into said chamber and between said extended surfaces of the air bearings and the bearing surfaces of the trackways.

3. A trackway guided ground effect vehicle comprising a body portion including a floor, generally peripherally depending skirt means defining with said floor an extended chamber opened toward the ground, depending truck means mounted on said body portion, flanged wheels carried by said truck means and adapted to engage trackways, a plurality of air bearing means mounted on each of said trucks, each of said air bearing means having a pair of extended surfaces, one of the pair of extended surfaces of each of the air bearing means positioned parallel with the bearing surface of the trackways, and the other of said extended surface extending at right angles to the other of said pair and adapted to be positioned adjacent a side face of the trackways, power means providing a stream of air, and conduit means for directing said stream of air into said chamber and between the extended surfaces of the air bearings and the opposed surfaces of the trackways.

4. The invention defined in claim 3 including means for vertically adjusting the height of said air bearing means relative to the flanged wheels carried by said truck means.

5. A trackway guided ground effect vehicle comprising a body portion including a floor, generally peripherally depending skirt means defining with said floor an extended chamber opened toward the ground, depending truck means mounted on said body portion, flanged wheels carried by said truck means and adapted to engage trackways, a plurality of air bearing means mounted on each of said trucks on either side of said vehicle in vertically spaced alignment with said trackways, each of said air bearing means comprising a pair of extended surface members positioned at right angles to one another, each of said extended surface members of each of said air bearing means having communication with a pressure chamber, openings in each of said extended surface members for the passage of pressure fluid from said pressure chambers, one of said extended surface members of each of said air bearing means being parallel with the bearing surface of the trackways and the other of said extended surface members of each of said air bearing means being positioned adjacent a side wall of the trackways, power means providing a stream of air, and conduit means for directing said stream of air into said extended chamber and into said pressure chambers to maintain a cushion of air between the floor of said vehicle and the ground and between the bearing surface of the trackways and one of the extended surface members of each of the air bearing means and between a side wall of the trackways and the other of the extended surface members of each of the air bearing means.

6. The invention defined in claim 5 wherein from about 50% to about 95% of the levitating force required for said vehicle is provided by the extended chamber.

References Cited in the file of this patent

UNITED STATES PATENTS

| 1,152,451 | Theryc | Sept. 7, 1915 |
| 1,698,482 | Nicin | Jan. 8, 1929 |
| 1,748,514 | Kucharzik et al. | Feb. 25, 1930 |
| 2,511,979 | Goddard | June 20, 1950 |
| 2,864,318 | Toulmin | Dec. 16, 1958 |

FOREIGN PATENTS

| 26,979 | France | Nov. 9, 1860 |

OTHER REFERENCES

Publication: Railway Age, Oct. 12, 1959, pages 30 and 31.

Publication: Product Engineering, Apr. 21, 1958, page 23.